United States Patent

Lévêque et al.

(10) Patent No.: US 10,412,540 B2
(45) Date of Patent: *Sep. 10, 2019

(54) TRACKING DEVICE LOCATION IDENTIFICATION

(71) Applicant: Tile, Inc., San Mateo, CA (US)

(72) Inventors: Pierre-Marie Lévêque, San Francisco, CA (US); Wayne Patterson, Burlingame, CA (US); Arunkumar Puppala, Fremont, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,474

(22) Filed: Dec. 20, 2018

(65) Prior Publication Data

US 2019/0253829 A1 Aug. 15, 2019

Related U.S. Application Data

(63) Continuation of application No. 15/897,159, filed on Feb. 15, 2018, now Pat. No. 10,219,107.

(60) Provisional application No. 62/460,602, filed on Feb. 17, 2017.

(51) Int. Cl.
| | | |
|---|---|---|
| *G08B 1/08* | (2006.01) | |
| *H04W 4/02* | (2018.01) | |
| *G08B 21/24* | (2006.01) | |
| *G08B 25/10* | (2006.01) | |
| *H04W 4/029* | (2018.01) | |
| *G08B 21/02* | (2006.01) | |

(52) U.S. Cl.
CPC ............. *H04W 4/02* (2013.01); *G08B 21/24* (2013.01); *G08B 25/10* (2013.01); *G08B 21/0269* (2013.01); *G08B 21/0272* (2013.01); *H04W 4/029* (2018.02)

(58) Field of Classification Search
CPC ......... H04W 4/02; G08B 21/24; G08B 25/10; G08B 1/08
See application file for complete search history.

(56) References Cited

U.S. PATENT DOCUMENTS

| | | | |
|---|---|---|---|
| 7,323,991 B1 * | 1/2008 | Eckert | G07C 9/00111 340/572.1 |
| 9,479,920 B1 * | 10/2016 | Mayor | H04W 52/0209 |
| 9,813,605 B2 * | 11/2017 | Peterson | G06K 9/00208 |
| 9,949,129 B1 * | 4/2018 | Henry | H04W 12/08 |
| 2007/0229350 A1 * | 10/2007 | Scalisi | G06F 21/35 342/350 |
| 2008/0143516 A1 * | 6/2008 | Mock | G01S 5/0294 340/539.14 |

(Continued)

*Primary Examiner* — Phung Nguyen
(74) *Attorney, Agent, or Firm* — Fenwick & West LLP

(57) ABSTRACT

A last known location of a tracking device can be determined by using location information received at a tracking system. A disconnection event is received at the tracking system indicating that a tracking device has disconnected from a mobile device. In response, the tracking system can generate a last known location for the tracking device. Other relevant location updates, such as recent locations of the mobile device or locations of other mobile devices that connect to the tracking device are collected and associated with the disconnection event. Based on the location updates, a last known location of the tracking device can be computed and stored.

20 Claims, 9 Drawing Sheets

(56) References Cited

U.S. PATENT DOCUMENTS

2014/0002239 A1\* 1/2014 Rayner .............. G08B 13/1427
340/5.61
2015/0332573 A1\* 11/2015 Selmanovic ........ H04L 67/1095
455/457

\* cited by examiner

US 10,412,540 B2

TRACKING DEVICE LOCATION IDENTIFICATION

CROSS REFERENCE TO RELATED APPLICATIONS

This application is a continuation of co-pending U.S. application Ser. No. 15/897,159, filed Feb. 15, 2018, now U.S. Pat. No. 10,219,107, claims the benefit of U.S. Provisional Application No. 62/460,602, filed Feb. 17, 2017, which are herein incorporated in their entirety by reference.

BACKGROUND

This disclosure relates generally to tracking devices, and more specifically, to determining a last known location for a tracking device Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object, (e.g., if it becomes lost).

However, traditional tracking devices and corresponding systems suffer from one or more disadvantages. For instance, if a tracking device is lost, the limited wireless range of the tracking device prevents an owner of the tracking device from locating the tracking device from outside the range of the tracking device. Generating an accurate last known location of a tracking device can be important in allowing an owner to find a lost tracking device, for example, by narrowing the area to search for the tracking device. Existing methods for determining a last known location do not incorporate all available information to estimate the last known location, therefore improved methods for last known location determination are needed.

Figure 1:
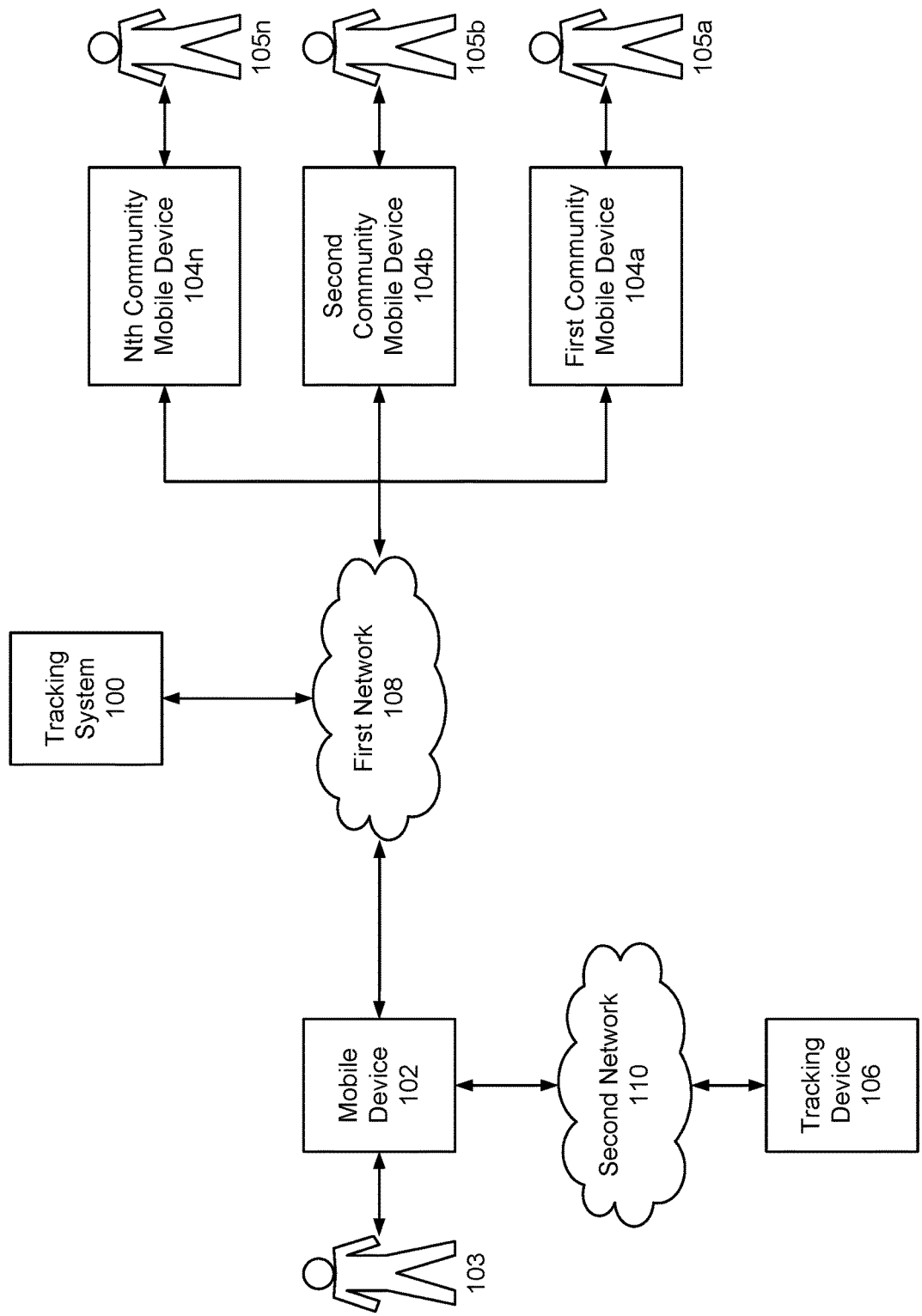
FIG. 1 illustrates an example tracking system environment in which a tracking device can operate, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. Or, a tracking device can be a device with a primary purpose unrelated to tracking functionality (e.g., a set of headphones, an electronic key, a wireless speaker, a fitness tracker, a camera) that has an integrated tracking component that allows the device to be tracked. The user can then use a mobile device (e.g., by way of a software application installed on the mobile device) or other device or service to track the tracking device. For example, the mobile device can perform a local search for a tracking device. However, in situations where the user is unable to locate the tracking device using their own mobile device (e.g., if the tracking device is beyond a distance within which the mobile device and the tracking device can communicate), the user can leverage the capabilities of a community of users of a tracking device system as described below.

A tracking system (also referred to herein as a "cloud server," "tracking server," or simply "server") can maintain user profiles associated with a plurality of users of the tracking system. The tracking system can associate each user within the system with one or more tracking devices associated with the user (e.g., tracking devices that the user has purchased and is using to track objects owned by the user, or devices that include a tracking component and have additional non-tracking features). If the user's tracking device, or the object to which the tracking device is attached, becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device. As used herein, "mobile device" can refer to a phone, tablet computer, or other connected device, and can also refer to systems typically not consider mobile, such as servers, routers, gateways, access points, and specialized systems configured to couple to tracking devices and report a location of the tracking devices.

As used herein, "tracking device" can refer to any device configured to communicate with another device for the purpose of locating the tracking device. Tracking devices can be specialized or single-purpose devices (e.g., self-contained devices that include circuitry or components to communicate with another device). However, "tracking device" as used herein can also refer to device or object with a different primary function but with secondary tracking device functionality. For example, a wireless speaker can include tracking device components that allow a user to track and/or locate the wireless speaker. In some embodiments, a tracking device platform can be established such that devices and objects that satisfy one or more criteria can act as tracking devices within a tracking device ecosystem. For instance, a tracking device provider can provide an SDK or custom chipset that, when incorporated into an object or device, enable the object or device to function as tracking devices, to communicate with other devices within the tracking device ecosystem, and to implement the functionalities described herein.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a first network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

System Overview

Figure 2:
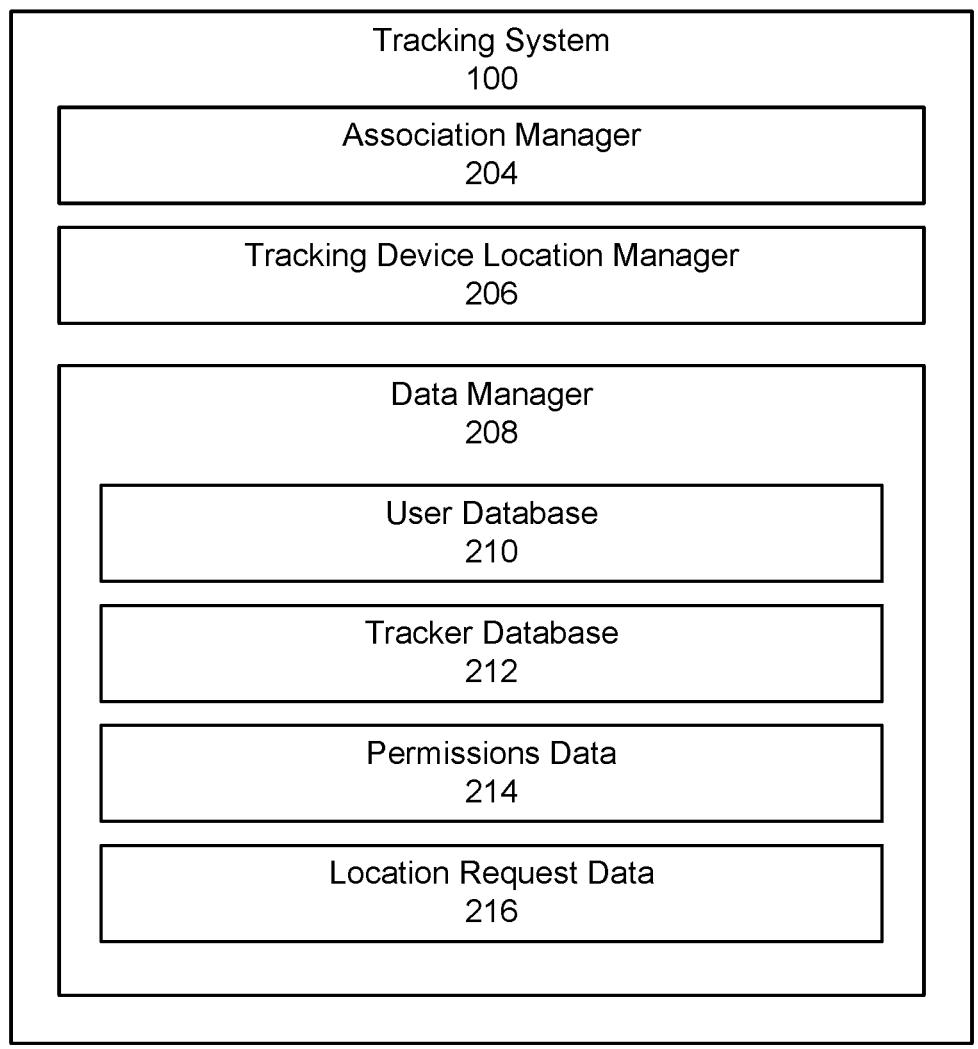
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication. In some embodiments, the tracking device location manager 206 determines and stores a last known location for a tracking device 106 in response to the tracking device 106 disconnecting from a mobile device 102 or, in some implementations, a community mobile device 104. The last known location for a tracking device 106 can be used as the most recent location associated with the tracking device 106 if the tracking device has not recently connected to a mobile device 102 or community mobile device 104.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106. Similarly, tracking data may include a last known location of the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

Figure 3:
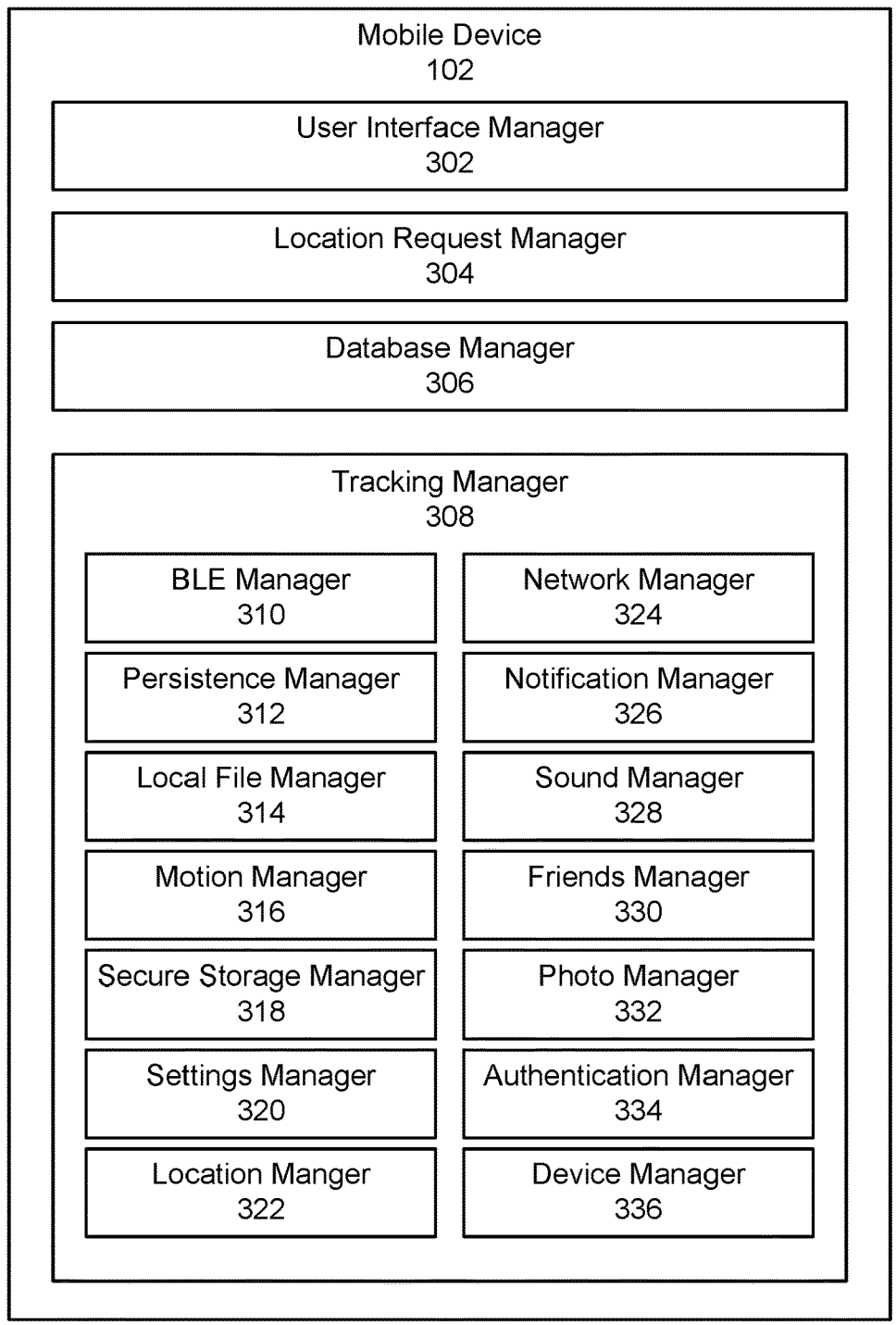
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable, from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
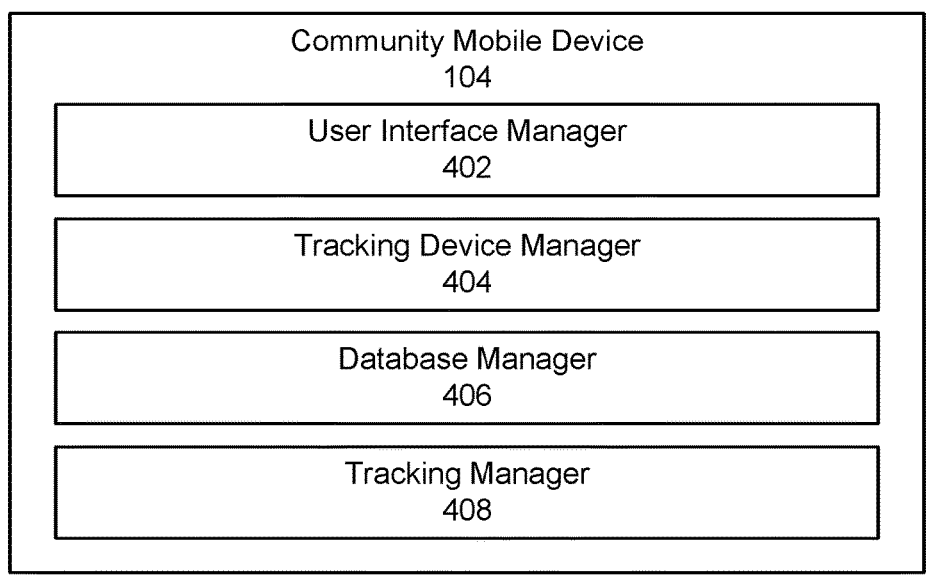
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
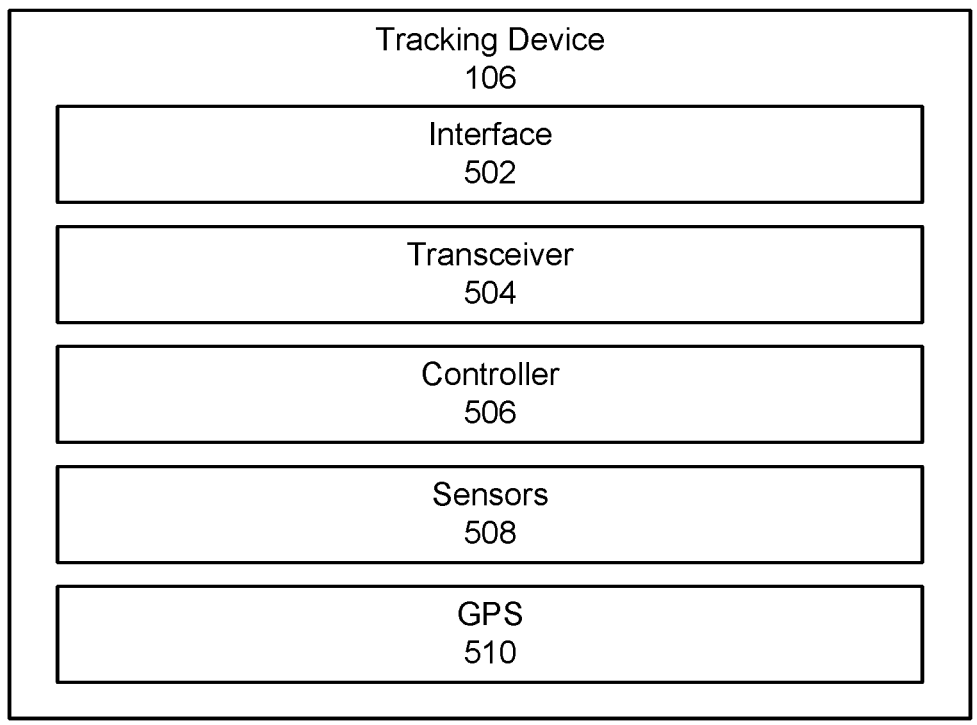
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, one or more sensors 508, and a GPS unit 510. The transceiver 504 is a hardware circuit capable of both transmitting and receiving signals. It should be noted that in other embodiments, the tracking device 106 includes fewer, additional, or different components than those illustrated in FIG. 5. For instance, tracking devices might not include the GPS unit 510 and can still implement the functionalities described herein.

The interface 502 provides a communicative interface between the tracking device 106 and one or more other devices, such as a mobile device 102. For instance, the interface 502 can instruct the transceiver 504 to output beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the pairing protocol can be a BLE connection, though in other embodiments, the interface 502 can manage other suitable wireless connection protocols (such as WiFi, Global System for Mobile Communications or GSM, and the like).

The controller 506 is a hardware chip that configures the tracking device 106 to perform one or more functions or to operate in one or operating modes or states. For instance, the controller 506 can configure the interval at which the transceiver broadcasts beacon signals, can authorize or prevent particular devices from pairing with the tracking device 106 based on information received from the devices and permissions stored at the tracking device, can increase or decrease the transmission strength of signals broadcasted by the transceiver, can configure the interface to emit a ringtone or flash an LED light, can enable or disable various tracking device sensors, can enable or disable a tracking device GPS unit, can enable or disable communicative functionality of the tracking device 106 (such as a GSM transmitter and receiving), can configure the tracking device into a sleep mode or awake mode, can configure the tracking device into a power saving mode, and the like. The controller 506 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508 or the GPS 510, or based on any other suitable criteria.

The sensors 508 can include motion sensors (such as gyroscopes or accelerators), altimeters, orientation sensors, proximity sensors, light sensors, or any other suitable sensor configured to detect an environment of the tracking device 106, a state of the tracking device 106, a movement or location of the tracking device 106, and the like. The sensors 508 are configured to provide information detected by the sensors to the controller 506. The GPS unit 510 is configured to detect a location of the tracking device 106 based on received GPS signals, and is configured to provide detected locations to the controller 506.

Last Known Location Determination

As described herein, determining and storing a last known location for a tracking device 106 can allow the tracking system 100 to provide an approximate location of a tracking device 106 to one or more mobile devices 102 or community mobile devices 104, even if the tracking device 106 has not recently connected to a mobile device 102 or community mobile device 104. In some embodiments, the mobile device 102 and community mobile device 104 report events including location data to the tracking system 100. For example, mobile devices can report events to the tracking system 100 periodically, or in response to any suitable trigger, such as connecting to a tracking device 106, disconnecting from a tracking device 106, if location data becomes available for the mobile device 102, or for any other suitable reason. For example, a mobile device 102 (or community mobile device 104) can report a disconnection event to the tracking system 100 when the mobile device 102 disconnects from a tracking device 106. A disconnection event can include various information about the mobile device 102 and the tracking device 106 at the time the tracking device 106 disconnected from the mobile device 102. For example, a disconnection event can contain, for example, a timestamp, tracking device ID, location of the mobile device 102 when the disconnection event was reported, and a location accuracy of the location. A location may be reported in any suitable format, such as a set of latitude-longitude coordinates.

In some implementations, the tracking system 100 uses the location of the mobile device 102 included in the disconnection event as the last known location of the tracking device 106. In some implementations, because the mobile device 102 was connected to the tracking device 106, the location of the mobile device 102 can be used as an estimate of the location of the tracking device 106 at that time. In some cases, the location reported with the disconnection event accurately represents the last known location of the tracking device 106. However, the location reported in the disconnection event is not always the most accurate available location for the tracking device 106, nor do all disconnection events contain a useable location. For example, location services may not be available for the mobile device 102 when the tracking device 106 disconnects, or location data for the mobile device 102 can be inconsistent or inaccurate when the tracking device 106 disconnects (for example, if the mobile device 102 is in a parking garage which interferes with GPS signals). Therefore, in some embodiments, determining the last known location for a tracking device 106 can be based on reported location information from a variety of sources or otherwise require more calculation than finding the most recently reported location for the tracking device 106.

In some embodiments, locations reported by the mobile device 102 before or after the disconnect event can be used to infer a last known location of the tracking device 106 at the time of the disconnection event. Similarly, a last known location for a tracking device 106 can be determined or improved based on locations reported by other mobile devices 102 or community mobile devices 104 which recently connected to the tracking device 106.

Figure 6:
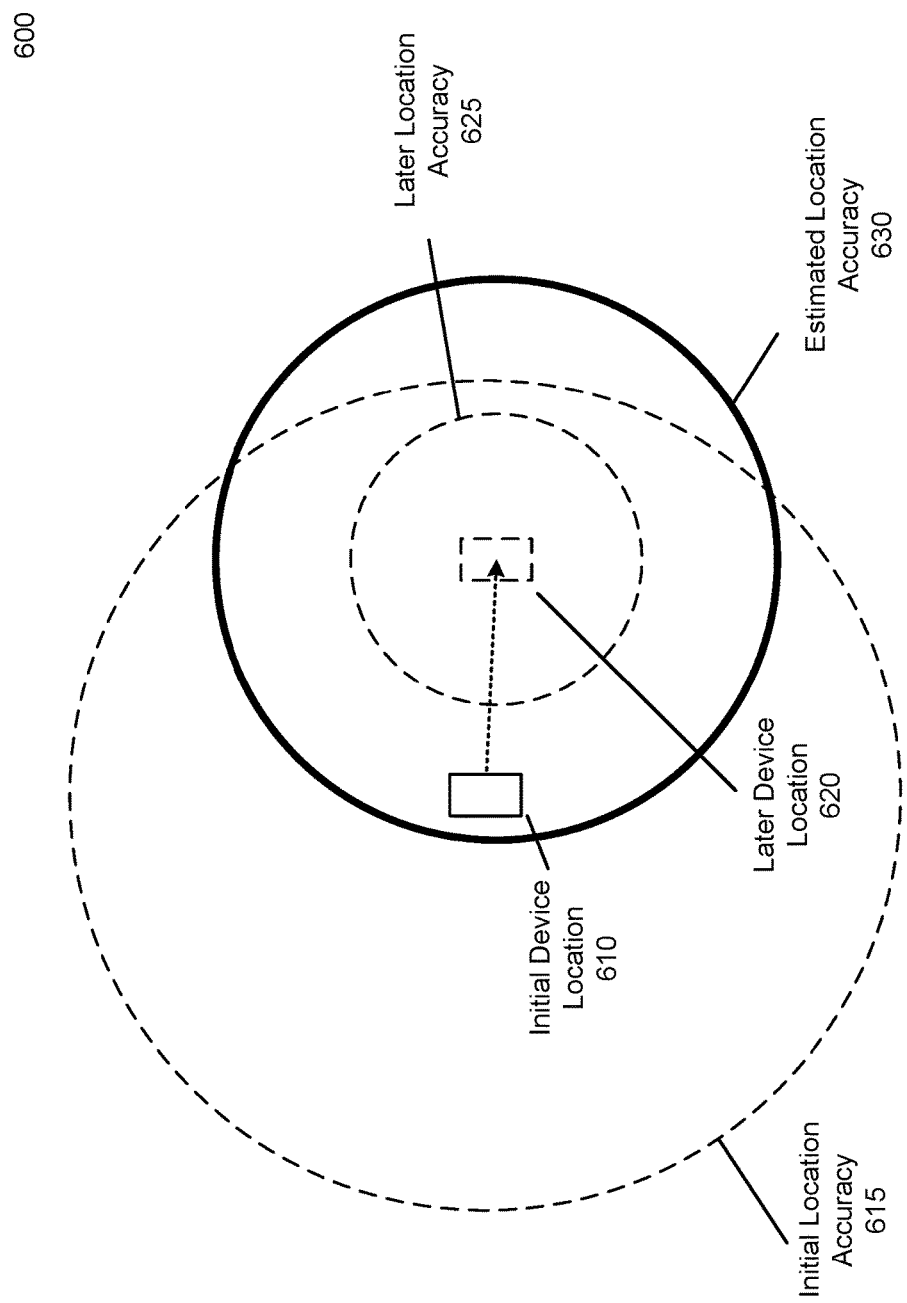
FIG. 6 illustrates an example environment for determining a tracking device location based on later mobile device location updates, according to one embodiment.

FIG. 6 illustrates an example environment for determining a tracking device location based on later mobile device location updates, according to one embodiment. The environment 600 of FIG. 6 includes an initial device location 610 with a corresponding initial location accuracy 615, a later device location 620 with a corresponding with a later location accuracy 625, and an estimate location accuracy 630.

In some embodiments, the initial device location 610 represents a location of the mobile device 102 at an initial time, for example, a location reported by the mobile device 102 in a disconnection event. The initial device location 610 is associated with a corresponding initial location accuracy 615 representing the potential deviation of the actual position of the mobile device 102 from the reported initial device location 610. The initial location accuracy 615 can be any suitable measure of the accuracy of the reported initial device location 610, for example an expected deviation from the initial device location 610 or a radius of a circle within which the mobile device 102 is expected to be located. The accuracy of a reported mobile device location can depend on available location services (for example, if a mobile device 102 has GPS disabled, but a rough location is determined based on nearby WiFi networks), natural variations or fluctuations in the reported location, environmental factors (for example, if the mobile device 102 is located in a parking structure or other building interfering with GPS signals), or any other suitable factor.

Over time, the mobile device 102 can report additional locations to the tracking system 100 in addition to the initial mobile device location 610, according to some embodiments. For example, if the initial device location 610 was reported in a disconnection event, the mobile device 102 can continue to report location information to the tracking system 100 in other events. A mobile device 102 can report a location to the tracking system 100 in response to a second disconnection event (associated with a different tracking device 106), periodically, while connected to a different tracking device 106, when connecting to the tracking system 100, or for any other suitable reason. In some implementations, each location reported by a mobile device 102 is associated with a location accuracy, which can vary based on, for example, environmental factors or natural variations as described above. The later device location 620 and later location accuracy 625 represent a relatively high accuracy location of the mobile device 102 reported at a time after the initial device location 610 was reported by the mobile device 102. For example, the later device location 620 can represent the location of the mobile device 102 25 seconds after the initial device location 610. In the embodiment of FIG. 6, the later device location 620 is more accurate than the initial mobile device location 610. For example, this could be due to the mobile device 102 reacquiring a GPS signal between the time the initial device location 610 was reported to the tracking system 100 and the time the later device location 620 was reported to the tracking system 100.

When a later device location 620 is more accurate than the initial device location 610, the later device location 620 can be used to generate a more accurate estimate of the location of the mobile device 102 at the time the initial device location 610 was reported. Later device location 620 can be used as the estimated location of the mobile device 102 at the initial time. In some embodiments, to determine the estimated location accuracy 630, the later location accuracy 625 is adjusted to account for the difference in time between the initial device location 610 and the later device location 620. For example, the estimated location accuracy 630 can take into account potential motion of the mobile device 102 in the intervening time between the initial device location 610 and the later device location 620. The later location accuracy 625 can be adjusted based on any suitable factor to generate the estimated device location 630, for example the difference in time between the initial and later device locations 610 and 620, the difference in location between the initial and later device locations 610 and 620, or any other suitable factor.

In the embodiment of FIG. 6, the estimated location accuracy 630 represents the adjusted accuracy of the estimated device location. In some embodiments, the estimated location accuracy 630 is more accurate than the initial location accuracy 615 (even after the adjustment). Therefore, the later device location 620 and estimated location accuracy 630 can be used as the last known location of the tracking device 106. Similar techniques can be used to determine a last known location for a tracking device 106 from location information preceding the disconnection event. In some embodiments, to be used as the last known location of a tracking device 106, the later location accuracy 625 of the later device location 620 should be greater than a threshold accuracy and the later device location 620 should be reported within a threshold time of the disconnection event.

Figure 7:
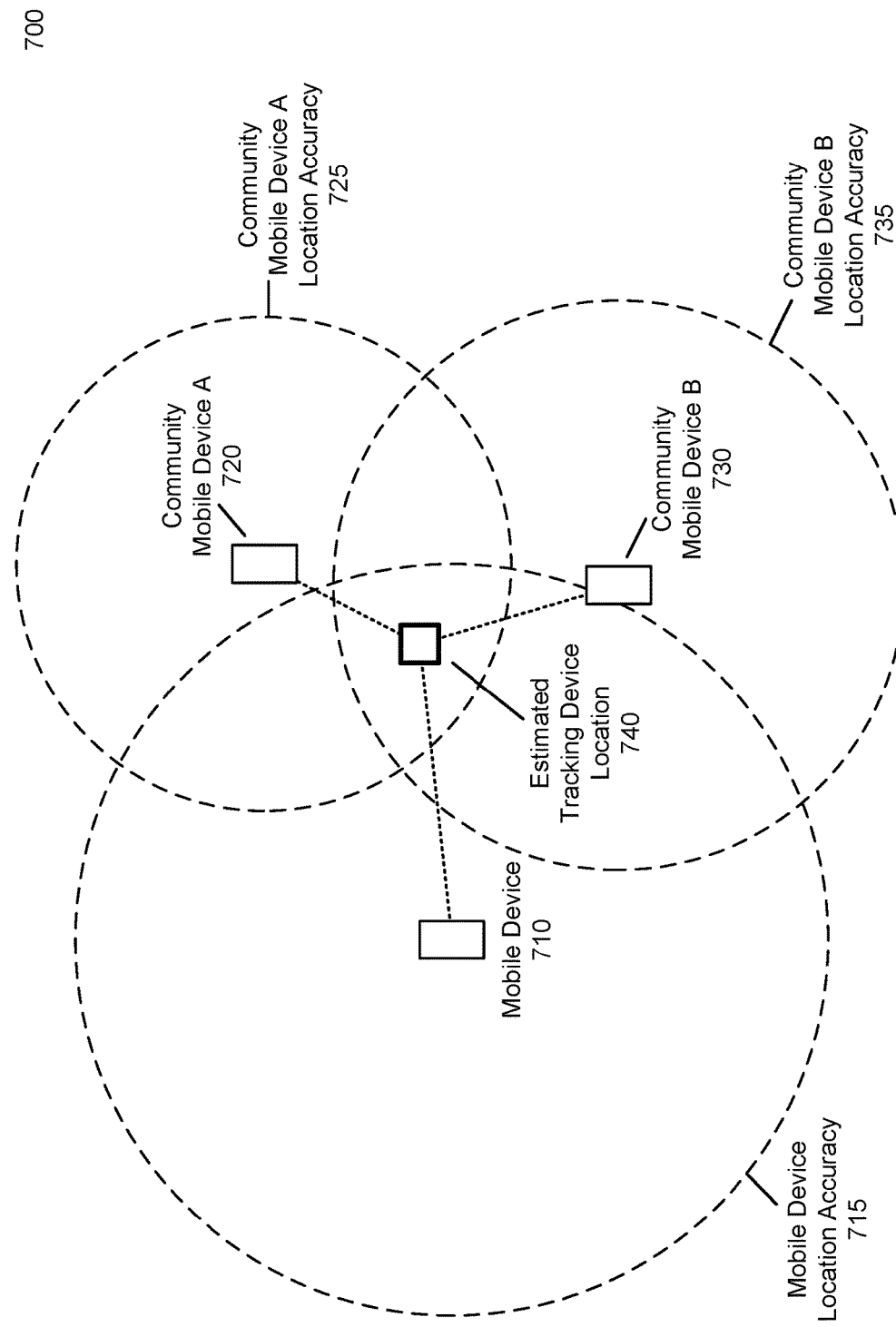
FIG. 7 illustrates an example environment for determining a tracking device location based on multiple reported locations, according to one embodiment.

FIG. 7 illustrates an example environment for determining a tracking device location based on multiple reported locations, according to one embodiment. The environment 700 of FIG. 7 includes a mobile device 710 and associated mobile device location accuracy 715, a community mobile device A 720 and associated community mobile device A location accuracy 725, a community mobile device B 730 and associated community mobile device B location accuracy 735, and an estimated tracking device location 740 determined based on the reported locations.

In the embodiment of FIG. 7, the mobile device 710 and the community mobile devices A 720 and B 730 each report (to the tracking system 100) a location associated with the same tracking device 106. Each reported location can be associated with other relevant information, for example, a timestamp, a signal strength of the tracking device 106 at the time the location was reported, and/or an accuracy of the reported location (for example, the mobile device location accuracy 715 and the community mobile device location accuracies A 725 and B 735). In some embodiments, reported locations used to determine the location of a tracking device 106 can be associated with various times, within a certain threshold time period of the time at which to estimate the location.

To estimate a location for a tracking device 106 from the known locations of mobile devices 102 and community mobile devices 104 connected to the tracking device 106, a location determination algorithm can be used, according to some embodiments. Each reported location (for example, the locations of the mobile device 710 and the community mobile devices A 720 and B 730) can be assigned a weight in the location determination algorithm based on any suitable factors, for example the timestamp of the reported location, the accuracy of the reported location, and/or the strength of signal of the tracking device 106 at the mobile device 102 (or community mobile device 104) when the location was reported. Any suitable location determination algorithm can be used to determine the estimated tracking device location 740 based on one or more reported locations. For example, a triangulation algorithm can be used to determine the estimated tracking device location 740, such as a Delaunay triangulation operation, a greedy triangulation operation, a jump-and-walk triangulation operation, a kinetic triangulation operation, or the like. In other embodiments, the estimated tracking device location 740 can be determined by a weighted average of the reported locations of the mobile device 710 and the community mobile devices A 720 and B 730, where each reported location is weighted based on one or more of the location accuracy, signal strength, and time of the reported location. In some embodiments, the accuracy of the estimated location can be calculated by similar methods.

In order to determine a last known location for a tracking device 106, additional data reported about the tracking device 106 can be collected and referenced to determine the last known location. However, a tracking system 100 may deal with large numbers of tracking devices 106, each associated with multiple mobile devices 102 and community mobile devices 104 which in turn report events (such as disconnection events) including location information and other relevant information the tracking system 100 in a continuous stream of data. Collecting the relevant data needed to determine a last known location of a tracking device based on each disconnection event can require the tracking system to filter and organize a large volume of data. Therefore, a "streaming" data system can be utilized to receive and organize relevant portions of data received at the tracking system 100 from a plurality of mobile devices 102 and community mobile device 104 to determine a last known location of a tracking device 106 for each disconnection event. In some implementations, a data streaming framework (for example, Apache Spark streaming) can be used to filter and organize incoming data (including disconnection requests and location updates) to determine a last known location. In some implementations, the data streaming framework allows the tracking system 100 to batch incoming data based on time and process each batch of data individually. For example, the incoming data stream can be separated and processed in batches of, for example, 20 seconds, or any other reasonable duration. In some embodiments, the duration of each batch is configurable, for example from 15-25 seconds.

Figure 8:
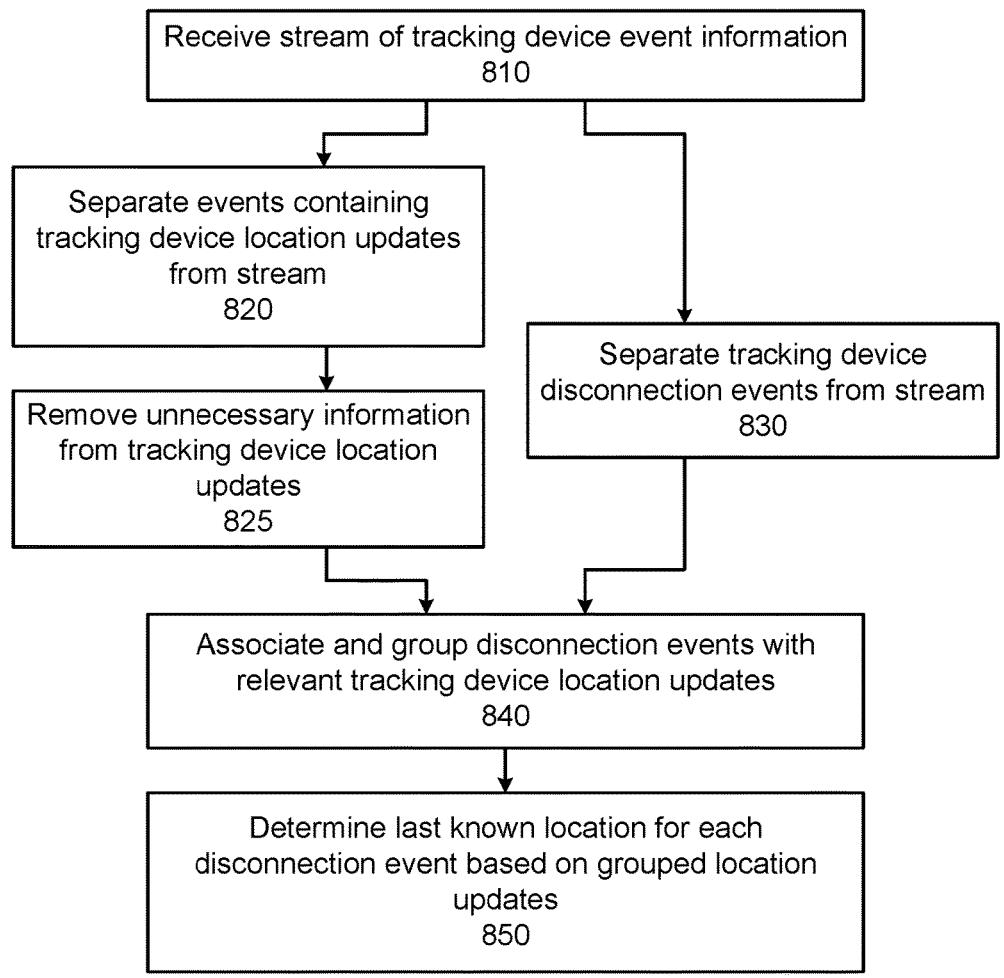
FIG. 8 is a flowchart illustrating an example process for filtering data for determining a last known location of a tracking device, according to one embodiment.

FIG. 8 is a flowchart illustrating an example process for filtering data for determining a last known location of a tracking device, according to one embodiment. In some implementations, the process 800 is followed for each batch of data reported as part of a continuous data stream. The process 800 begins when a stream of tracking device event information is received 810 at the tracking system. Then, the tracking system can separate 820 events containing location updates from the received stream. For example, location updates can comprise the location of a tracking device 106, mobile device 102, or community mobile device 104 and may be reported in the context of a disconnection event (or any other suitable event). In some implementations, disconnection events are also separately handled (for example at step 830) and are not separated as part of step 820. Information unnecessary for calculating a last known location of a tracking device 106 can then be removed 825 from the separated location update data. For example, each event containing a device location update can be reduced to a timestamp of the event, an identifier of the reporting mobile device 102 (or community mobile device 104), an identifier of a connected tracking device 106 (if present), a location of the reporting mobile device 102, a location accuracy of the reported location, a signal strength of the tracking device 106 at the reporting mobile device 102, and any other relevant information. For example, a MapReduce operation can be used to reduce location updates to only relevant information for calculating a last known location. In some implementations, filtering each tracking device location update to remove unnecessary information improves the performance of the tracking system by reducing the volume of data needed to be stored to determine the last known location of a tracking device 106.

Disconnection events can be similarly separated 830 from the received data stream. Each disconnection event is then associated and grouped 840 with relevant tracking device location updates. For example, the tracking system 100 can associate each tracking device disconnection event with the location updates associated with the same tracking device 106 as the disconnection event and/or any other location updates from the reporting mobile device 102. The grouped location updates, including any location updates from the disconnection event itself, can then be used to determine 850 the last known location for the disconnected tracking device 106.

Figure 9:
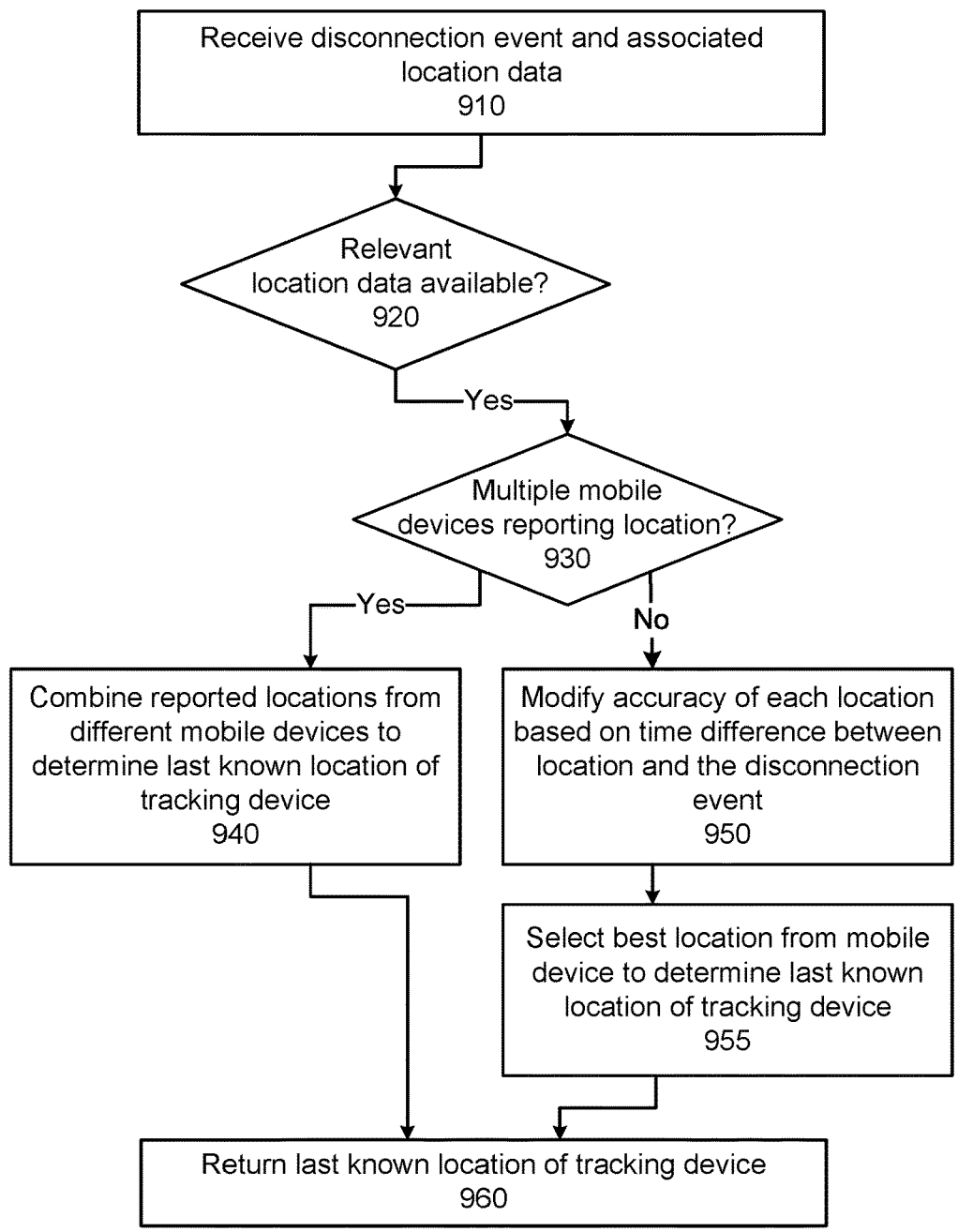
FIG. 9 is a flowchart illustrating an example process for determining the last known location of a tracking device, according to one embodiment.

FIG. 9 is a flowchart illustrating an example process for determining the last known location of a tracking device, according to one embodiment. The process 900 begins when a disconnection event and associated location is received 910, for example at a tracking system. In some implementations, the disconnection event includes location data, but the associated location data can also comprise additional location data gathered from other mobile devices or from different points in time than the disconnection event. For example, FIG. 8 discloses a process for filtering and organizing disconnection events with relevant location information. If relevant location data is available 920, the process 800 can proceed with determining the last known location. For example, associated location data may need to be within a certain time window of the disconnection event, or have a threshold level of accuracy to be used to generate a last known location. In some embodiments, if no suitable location data is available for the disconnection event, no last known location can be determined for the tracking device.

In the process 900, if multiple mobile devices (or community mobile devices) are reporting location data for the tracking device 930, the reported location from each reporting mobile device can be combined 940 to determine the last known location of the tracking device. For example, a triangulation algorithm or weighted average of the reported locations can be used, as described in relation to FIG. 7. In some implementations, only one location from each reporting mobile device is used to calculate the last known location of the tracking device (for example, the highest accuracy or the reported location closest in time to the disconnection event).

In other cases, only one mobile device (or community mobile device) report relevant location data 930 about the tracking device. In these cases, the location (or locations) reported by the mobile device can be used to calculate the last known location. First, the tracking system can modify 950 the accuracy of each reported location based on the time difference between the location and the disconnection event (and any other suitable factor). After each location is modified to account for the time different, the tracking system can select 955 the best and/or most accurate location as the last known location of the tracking device.

In either case, the last known location of the tracking device is returned 960. For example, the last known location can then be stored within the tracking system for later use, sent to an owner of the tracking device, or used for any other suitable purpose.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for determining a last known location of a tracking device, the method comprising:
   receiving, by a tracking server from a first mobile device, a disconnection event indicating that a first tracking device has disconnected from the first mobile device, the disconnection event comprising an identifier of the first tracking device, a location of the first mobile device when the first tracking device disconnected from the first mobile device, and a first timestamp of the disconnection;
   receiving, by the tracking server, a set of location updates, each location update received in response to a mobile device detecting the first tracking device and comprising a location of the mobile device when the mobile device detected the first tracking device, the identifier of the first tracking device, and a timestamp of the detection;
   determining, by the tracking server, a last known location of the first tracking device based on the disconnection event and one or more location updates selected out of the received set of location updates based on the timestamps associated with each of the selected one or more location updates.

2. The method of claim 1, wherein determining the last known location of the first tracking device comprises:
   selecting, from the received set of location updates, one or more location updates comprising a timestamp within a threshold amount of time of the first timestamp of the disconnection.

3. The method of claim 1, wherein the received set of location updates comprises location updates received from one or more mobile devices other than the first mobile device, and wherein determining the last known location of the first tracking device comprises:
   combining the location of each of the one or more selected location updates and the location of the disconnection event.

4. The method of claim 3, wherein combining the location of each of the one or more selected location updates and the location of the disconnection event comprises performing a triangulation operation on the location of each selected location update and the location of the disconnection event to determine the last known location of the first tracking device.

5. The method of claim 1, wherein determining the last known location of the first tracking device comprises determining a weighted average of the disconnection event and the one or more selected location updates each weighted by a measure of accuracy of the corresponding location information.

6. The method of claim 1, wherein determining the last known location of the first tracking device comprises determining a weighted average of the disconnection event and the one or more selected location updates each weighted by a time difference between the timestamp of the selected location update and the first timestamp of the disconnection event.

7. The method of claim 1, wherein determining the last known location of the first tracking device comprises computing an updated location for a selected location update based on a difference between the timestamp of a selected location update and the first timestamp, and wherein the last known location for the first tracking device is determined based at least in part of the updated location.

8. The method of claim 1, wherein each of the received location updates comprises a measure of accuracy of the associated location and wherein determining the last known location of the first tracking device comprises:
   determining an updated measure of accuracy of each of the one or more selected location updates based on a time difference between the disconnection event and the selected location update and the measure of accuracy of the selected location update; and
   selecting a last known location out of the location associated with the disconnection event and the one or more selected location updates based on the updated measures of accuracy associated with each of the selected location updates.

9. The method of claim 1, further comprising modifying, by the tracking server, an interface displayed by the first mobile device associated with an owner of the first tracking device to indicate the determined last known location of the first tracking device.

10. The method of claim 9, wherein the first mobile device is configured to modify a map interface on the first mobile device to display the determined last known location of the first tracking device.

11. A non-transitory computer-readable storage medium comprising instructions which, when executed by a processor of a tracking device server, cause the processor to perform steps comprising:
   receiving, from a first mobile device, a disconnection event indicating that a first tracking device has disconnected from the first mobile device, the disconnection event comprising an identifier of the first tracking device, a location of the first mobile device when the first tracking device disconnected from the first mobile device, and a first timestamp of the disconnection;
   receiving a set of location updates, each location update received in response to a mobile device detecting the first tracking device and comprising a location of the mobile device when the mobile device detected the first tracking device, the identifier of the first tracking device, and a timestamp of the detection;

determining a last known location of the first tracking device based on the disconnection event and one or more location updates selected out of the received set of location updates based on the timestamps associated with each of the selected one or more location updates.

12. The non-transitory computer-readable storage medium of claim 11, wherein determining the last known location of the first tracking device comprises:

selecting, from the received set of location updates, one or more location updates comprising a timestamp within a threshold amount of time of the first timestamp of the disconnection.

13. The non-transitory computer-readable storage medium of claim 11, wherein the received set of location updates comprises location updates received from one or more mobile devices other than the first mobile device, and wherein determining the last known location of the first tracking device comprises:

combining the location of each of the one or more selected location updates and the location of the disconnection event.

14. The non-transitory computer-readable storage medium of claim 13, wherein combining the location of each of the one or more selected location updates and the location of the disconnection event comprises performing a triangulation operation on the location of each selected location update and the location of the disconnection event to determine the last known location of the first tracking device.

15. The non-transitory computer-readable storage medium of claim 11, wherein determining the last known location of the first tracking device comprises determining a weighted average of the disconnection event and the one or more selected location updates each weighted by a measure of accuracy of the corresponding location information.

16. The non-transitory computer-readable storage medium of claim 11, wherein determining the last known location of the first tracking device comprises determining a weighted average of the disconnection event and the one or more selected location updates each weighted by a time difference between the timestamp of the selected location update and the first timestamp of the disconnection event.

17. The non-transitory computer-readable storage medium of claim 11, wherein determining the last known location of the first tracking device comprises computing an updated location for a selected location update based on a difference between the timestamp of a selected location update and the first timestamp, and wherein the last known location for the first tracking device is determined based at least in part of the updated location.

18. The non-transitory computer-readable storage medium of claim 11, wherein each of the received location updates comprises a measure of accuracy of the associated location and wherein determining the last known location of the first tracking device comprises:

determining an updated measure of accuracy of each of the one or more selected location updates based on a time difference between the disconnection event and the selected location update and the measure of accuracy of the selected location update; and selecting a last known location out of the location associated with the disconnection event and the one or more selected location updates based on the updated measures of accuracy associated with each of the selected location updates.

19. The non-transitory computer-readable storage medium of claim 11, further comprising instructions which, when executed by the processor, modify an interface displayed by the first mobile device associated with an owner of the first tracking device to indicate the determined last known location of the first tracking device.

20. The non-transitory computer-readable storage medium of claim 19, wherein the first mobile device is configured to modify a map interface on the first mobile device to display the determined last known location of the first tracking device.

* * * * *